(12) United States Patent
Schönherr et al.

(10) Patent No.: US 8,136,658 B2
(45) Date of Patent: Mar. 20, 2012

(54) METHOD OF PRESERVING A SENSOR IN A CONTAINER AND A CONTAINER CONTAINING A SENSOR AND A STORAGE SOLUTION

(75) Inventors: Holger Schönherr, Gronau (DE); Ewa Agnieszka Tocha-Bielak, Halle/Saale (DE); Daniel Bastiaan Bijl, Putten (NL); Gyula Julius Vancso, Hengelo (NL)

(73) Assignee: SmartTip B.V., Enschede (NL)

( * ) Notice: Subject to any disclaimer, the term of this patent is extended or adjusted under 35 U.S.C. 154(b) by 0 days.

(21) Appl. No.: 12/745,447

(22) PCT Filed: Feb. 18, 2008

(86) PCT No.: PCT/NL2008/000047
§ 371 (c)(1),
(2), (4) Date: Sep. 17, 2010

(87) PCT Pub. No.: WO2009/070005
PCT Pub. Date: Jun. 4, 2009

(65) Prior Publication Data
US 2011/0203945 A1   Aug. 25, 2011

(30) Foreign Application Priority Data
Nov. 29, 2007   (NL) ..................... 1034776

(51) Int. Cl.
*B65D 81/24* (2006.01)
*C23F 11/08* (2006.01)
(52) U.S. Cl. ............... 206/210; 422/1; 422/7; 422/23; 422/560
(58) Field of Classification Search ....... 206/205–213.1, 206/524.1, 524.4; 422/1, 22, 56, 560, 7, 422/23
See application file for complete search history.

(56) References Cited

U.S. PATENT DOCUMENTS
5,690,215 A * 11/1997 Kimball et al. ............ 206/213.1
(Continued)

FOREIGN PATENT DOCUMENTS
JP   62 067436 A   3/1987
JP   09 119939 A   5/1997

OTHER PUBLICATIONS

Kilpatrick, C. William, "Noncryogenic Preservation of Mammalian Tissues for DNA Extraction: An Assessment of Storage Methods", Biochemical Genetics, vol. 40, No. 1-2, Feb. 2002, pp. 53-62, XP002482473, ISSN: 0006-2928.

*Primary Examiner* — Byron Gehman
(74) *Attorney, Agent, or Firm* — Shewchuk IP Services, LLC; Jeffrey D. Shewchuk

(57) ABSTRACT

The invention relates to a method of preserving a sensor in a container, said sensor comprising a sensing area of metallic or a semi-conducting material covered with molecules having a MW>100 Dalton, said molecules being bound to the material wherein at least the sensing area of the layer is kept submerged in a storage solution, said storage solution having a composition that consists for at least 80% by volume of at least one compound chosen from water, ethanol, triethylene glycol and isopropanol, with the provisios that
   if the concentration of ethanol is at least 80 vol. % of the storage solution ethanol is present in a concentration of no more than 93% by volume of the storage solution;
   if water is present, it is present in a concentration of less than 80% by volume of the storage solution. The invention also relates to a container containing a sensor and a storage solution.

20 Claims, 1 Drawing Sheet

U.S. PATENT DOCUMENTS 5,954,748 A 9/1999 Totakura
6,316,273 B1 * 11/2001 King ............................. 436/518
6,923,936 B2 * 8/2005 Swanson et al. ................ 422/22
7,833,474 B2 * 11/2010 Swanson et al. ................ 422/22

* cited by examiner

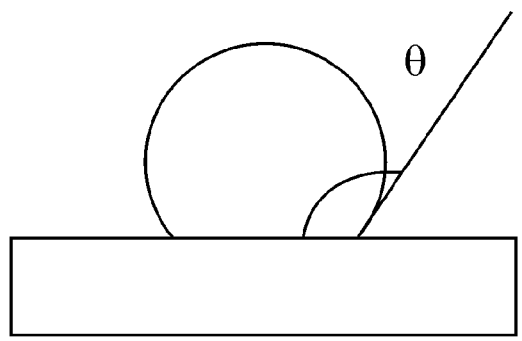 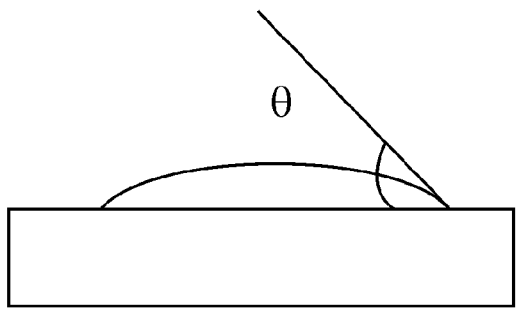
Fig. 1A                    Fig. 1B
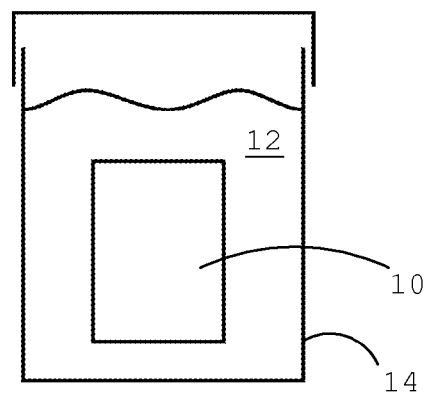
Fig. 2

METHOD OF PRESERVING A SENSOR IN A CONTAINER AND A CONTAINER CONTAINING A SENSOR AND A STORAGE SOLUTION

The present invention relates to a method of preserving a sensor in a container.

Sensors, in particular those for delicate measurements such as such as force sensors and probe tips for Atomic Force Microscopy, need to be preserved in containers for storage, transport etc. until use. It is paramount to maintain the quality of the sensing area, or at least slow down its deterioration and/or contamination as much as possible. To this end it is known to store the sensor under a storage solution, which should help to meet said requirements.

A problem with storing a sensor in a container is that a gas bubble, especially if it comprises oxygen, such as air, may get entrapped or develop in the container and which may shield the sensor area from the storage solution, as a result of which the quality of said surface cannot be protected by the storage solution. This problem occurs in particular in those containers where the sensor is mounted, because due to the small dimensions of the sensor a gas bubble in contact with the sensing area will also be close to the container wall (including the lid) or mounting means protruding from the container wall, which helps to stabilize the gas bubble into place.

The object of the present invention is to provide a method for storing the sensor for which this risk is reduced.

To this end, the method according to the invention is a method of preserving a sensor in a container, said sensor comprising a sensing area of metallic or a semi-conducting material covered with molecules having a MW>100 Dalton, said molecules being bound to the material wherein at least the sensing area of the layer is kept submerged in a storage solution, said storage solution having a composition that consists for at least 80% by volume of at least one compound chosen from water, ethanol, triethylene glycol and isopropanol, with the provisios that if the concentration of ethanol is at least 80 vol. % of the storage solution ethanol is present in a concentration of no more than 93% by volume of the storage solution;

if water is present, it is present in a concentration of less than 80% by volume of the storage solution.

Thus the present invention provides for a method making use of a storage solution that not only is capable of preserving submerged sensing areas very well, but also reduces the chance of entrapment of gas bubbles at the sensing area. The term bound as used in the present application means adsorbed to and/or chemically linked to the material of the sensing area. Thus the molecules are physically and/or chemically bound to the sensing area. In case of chemical binding, the molecules are generally attached to the sensing area via sulphur-comprising linkages. These may, for example be formed by reaction of a thiol, sulphide, disulphide, thiophene, cysteine-residue, with the material. According to an important embodiment, the molecules form a monolayer. An important embodiment of such a monolayer is a layer of R—S— residues, where R is a saturated or unsaturated alkyl chain optionally carrying one or more functional groups. The functional group is preferably an end-group. Suitable functional groups, which are in general chosen so as to provide the desired sensor characteristics, are, for example, —OH, —COOH, —CHO, —COOR', —CH$_2$—O—CO—R', —C—O—R', —CONH$_2$, —CONHR', —CONR'R", —CN, —NC, —SCN, —NCS, —CH=CH$_2$, —C-triple bond —CH, —NH$_2$, —NR'R", —NR'R"R'", —SO$_3^-$, —N$_3$, —CH$_3$, —CH$_2$F, —CHF$_2$, —CF$_3$, —Br, —Cl, —F, —BR'R", epoxy, —Si(OR')$_3$, phosphate —O—P=O(OH)—O$^-$, —(CH$_2$—CH$_2$—O)$_n$—H or —(CH$_2$—CH$_2$—O)$_n$—CH$_3$. etc., where R', R" and R'" are linear branched alkyl-groups. A semi-conducting material of the sensing area is preferably gallium arsenide. The metallic material of the sensing area is suitably chosen from platinum, silver, palladium, copper, iron and preferably gold. Platinum, silver, palladium, copper, iron and gold alloys are also included as suitable metallic materials. If the sensor is a surface plasmon sensor, the metallic substrate will be silver or gold. When it is stated that the storage solution consists for a particular percentage of one or more of the above specified compounds, the remainder of the storage solution is made up by, e.g. other miscible solvents and/or dissolved compounds. If a statement is made where two or more of the above compounds are specified by name, the presence of other of the above compounds is not excluded.

According to a preferred embodiment, the storage solution consists for at least 90, preferably at least 95 and most preferably at least 98% by volume of at least 2 compounds chosen from water, ethanol, triethylene glycol and isopropanol.

This storage solution shows excellent long-term storage properties.

According to a preferred embodiment at least two compounds chosen from water, ethanol, triethylene glycol and isopropanol are present, and at least two of these compounds are present in a concentration of at least 8% by volume each with respect to the storage solution, preferably 20% by volume, and more preferably at least 30% by volume each.

Such a mixture is suitable for both hydrophobic and hydrophilic layers.

More preferable is the embodiment according to which the storage solution consists of at least 90% by volume of water and isopropanol.

Isopropanol does not disturb the favourable properties of water in protecting hydrophilic surfaces, yet makes it much less likely that gas bubbles can interfere with proper storage.

A preferred embodiment is characterized in that the storage solution is treated with an inert gas, preferably argon.

This increases shelf life even more. In general, it will be most convenient to pass the inert gas through the storage solution before contacting the storage solution with the sensor.

The present invention also relates to a container containing a sensor and a storage solution, said sensor comprising a sensing area of metallic or a semi-conducting material covered with molecules having a MW>100 Dalton, said molecules being bound to the material, at least the sensing area of the layer being submerged in a storage solution, said storage solution having a composition that consists for at least 80% by volume of at least one compound chosen from water, ethanol, triethylene glycol and isopropanol, with the provisios that if the concentration of ethanol is at least 80 vol. % of the storage solution ethanol is present in a concentration of no more than 93% by volume of the storage solution;

if water is present, it is present in a concentration of less than 80% by volume of the storage solution.

Obviously, the term containing does not preclude the presence of other objects or compounds. Preferably, the container will not be permeable for any of the compounds of the storage solution, and will hold the storage solution in a sealed manner, preventing both escape from the container by leakage or evaporation. In addition it is preferred that the container is capable of preventing entry of compounds from the surroundings into the container, including atmospheric gasses, in particular oxygen. Generally, the container will have a lid. Suitable containers satisfying these requirements are known in the art and do not need any further elucidation.

The present invention will now be illustrated with reference to the following examples and drawings, where FIG. 1a illustrates the concept of contact angle, and shows how a water droplet might appear on a hydrophobic surface and FIG. 1B shows how a water droplet might appear on a hydrophilic surface; and FIG. 2 schematically illustrates a sensor 10 in a storage solution 12 in a container 14.

Two different alkanethiol-based monolayers on gold substrates on Si (100) (P/Boron type, thickness 525±25 µm, Okmetic Oyj, Vantaa, Finland) were prepared. The first is polar because of an —COOH end-group. The second is unsubstituted, and consequently has a non-polar —$CH_3$ as end-group. The gold substrates were prepared in clean room by sputtering 15 nm of Ti adhesive layer followed by sputtering 100 nm of Au on freshly cleaned Si wafers. Prior to formation of the monolayers, the Au substrates were cleaned in piranha solution (7:3 mixture of concentrated $H_2SO_4$ and 30% $H_2O_2$) [CAUTION! Piranha solutions should be handled with great care in open containers in a fume hood. Piranha is highly corrosive and toxic and potentially explosive.], followed by rinsing with Milli-Q water and ethanol. The self-assembled monolayers (SAM) were spontaneously absorbed by immersing freshly cleaned Au substrates into argon saturated ethanolic solution of thiol compounds (concentration $10^{-3}$ M) for 24 hours. After removal from the solution, the samples were rinsed thoroughly with ethanol and dried in a flow of nitrogen gas. Two types of thiols were used 1-octadecanthiol (Aldrich, Sigma-Aldrich, St. Louis, Mo.) and 16-mercapto-1-hexadecanoic acid (Aldrich, Sigma-Aldrich, St. Louis, Mo.) with non-polar (hydrophobic) and polar (hydrophilic) end-groups, respectively.

For long-term storage experiments, freshly prepared SAM samples were transferred into piranha cleaned glass bottles with solvent, which were subsequently de-oxygenated by passing argon through it for at least 15 min, and tightly closed. Every series of measurements consisted of at least 2 SAM samples.

The following pure solvents were used as storage medium:
ethanol (≧99.9% purity, Merck, Darmstadt, Germany),
methanol (99.8% purity, Biosolve, Westford, Mass.),
isopropanol (99.8% purity, Biosolve, Westford, Mass.),
perfluorodecalin (≧95.0% purity, Fluka, Sigma-Aldrich, St. Louis, Mo.),
n-heptan (≧99.0% purity, Merck, Darmstadt, Germany),
decane (≧99.0% purity, Aldrich, Sigma-Aldrich, St. Louis, Mo.),
n-propanol (99.0% purity, Merck, Darmstadt, Germany),
n-butanol (99.0% purity, Merck, Darmstadt, Germany),
tri-ethyleneglycol (99.0% purity, Aldrich, Sigma-Aldrich, St. Louis, Mo.),
methyl ethyl keton (99.5% purity, Merck, Darmstadt, Germany),
ethyl acetate (≧99.9% purity, Merck, Darmstadt, Germany),
$H_2O$ (resistivity of 18.2 MΩ cm (@ 25° C.), Milli-Q Plus, Milli-pore, Billerica, Mass.), Milli-Q water is ultrapure water obtained from deionized water that has been purified using an ion exchange cartridge. The purity of the water is monitored by measuring the resistance of the water to conducting electricity.

Various solvent mixtures were prepared by taking specified volume parts of solvents and blending together e.g 1:9 mixture of $H_2O$ and isopropanol was obtained by taking one volume part of water and 9 volume parts of isopropanol and then mixed together. These included: $H_2O$+isopropanol in proportions of 1:9, 1:1 and 9:1, and $H_2O$+ethanol and ethanol+isopropanol in proportions of 1:1.

The quality of the freshly prepared SAM samples and after long-time storage was assessed from water contact angle measurement (OCA 15plus, Data Physics, Filderstadt, Germany), which is a method for surface analysis related to surface energy and tension. Contact angle θ (CA) describes the shape of a liquid droplet resting on a solid surface (see FIG. 1). When drawing a tangent line from the droplet to the touch of the solid surface, the contact angle is the angle between the tangent line and the solid surface (FIG. 1). When a droplet of liquid rests on the surface of a solid, the shape of the droplet is determined by the balance of the interfacial liquid/vapor/solid forces. On extremely hydrophilic surfaces, a water droplet will completely spread (an effective contact angle of 0°). This occurs for surfaces that have a large affinity for water (including materials that absorb water). On many hydrophilic surfaces, water droplets will exhibit contact angles of 10° to 30°. On hydrophobic surfaces, which are incompatible with water, one observes a large contact angle (above 90°). CA can be used to detect the presence of films, coating, or contaminants with a surface energy different from that of the underlying substrate. This difference of wettability is illustrated in FIG. 1. FIG. 1A shows how a water droplet might appear on a hydrophobic surface such as $CH_3$-terminated SAM. FIG. 1B shows how a water droplet might appear on a hydrophilic surface such as COOH— terminated SAM.

The sessile drop technique was used to measure the quality of SAM samples. A droplet of liquid was dispensed automatically onto the substrate surface with volume of 0.5 µl and 0.2 µl for $CH_3$-terminated and COOH-terminated SAM, respectively. The profile of the droplet was projected through the magnifier and a CCD camera and analyzed using the commercial software. After detection of the baseline, the shape of the drop was obtained using best-fit analysis, which automatically detects the drop profile and calculates the CA. For each sample at least 3-drop measurements were performed (2 samples per experiment were used). The mean value and standard deviation were calculated using statistical analysis of at least 12 measured CA for each experiment. The resulting data are shown below. We define a change of CA values after certain storage time as a difference between CA of tested sample and CA of freshly prepared sample. The increase of CA for hydrophilic sample (COOH-terminated SAM) indicates contamination or degradation of the layer and thus deactivation of its functionality. In case of hydrophobic samples ($CH_3$-terminated SAM), degradation of sensor layer will occur as decrease in CA. Only medium that does not alter significantly CA in long term storage experiments, ensures long term stability of the layer and its uncompromised functionality.

X-Ray photoelectron spectroscopy (XPS) data showed that the atomic composition of the monolayers was to within the experimental error identical to freshly prepared layers for storage in pure isopropanol for 15 weeks (both —COOH and —CH3; data not shown).

TABLE 1

COOH-terminated self-assembled monolayers (SAM) on Au stored in different solvents for 1 hour at 20° C.

| | storage time | | |
|---|---|---|---|
| | values of CA | | change of CA values after |
| medium | fresh | 1 hour | 1 hour |
| $H_2O$ | ≦10.0 | ≦10.0 | not measurable |
| isopropanol | ≦10.0 | ≦10.0 | not measurable |
| methanol | ≦10.0 | ≦10.0 | not measurable |
| ethanol | ≦10.0 | ≦10.0 | not measurable |
| n-propanol | ≦10.0 | ≦10.0 | not measurable |
| n-butanol | ≦10.0 | ≦10.0 | not measurable |
| methyl ethyl keton | ≦10.0 | ≦10.0 | not measurable |
| tri ethyleneglycol | ≦10.0 | 10.9 ± 2.6 | 0.9 ± 2.6 |
| ethyl acetate | ≦10.0 | ≦10.0 | not measurable |
| perfluorodecalin | ≦10.0 | ≦10.0 | not measurable |
| heptane | ≦10.0 | 21.2 ± 11.7 | 11.2 ± 11.7 |
| decane | ≦10.0 | ≦10.0 | not measurable |

TABLE 2

$CH_3$-terminated SAM on Au stored in different solvents for 1 hour at 20° C.

| | storage time | | |
|---|---|---|---|
| | values of CA | | change of CA values after |
| medium | fresh | 1 hour | 1 hour |
| $H_2O$ | 108.4 ± 1.0 | 107.8 ± 1.0 | −0.6 ± 1.4 |
| isopropanol | 108.4 ± 1.0 | 108.1 ± 1.8 | −0.3 ± 2.1 |
| methanol | 108.4 ± 1.0 | 106.9 ± 1.7 | −1.5 ± 2.0 |
| ethanol | 108.4 ± 1.0 | 107.1 ± 3.3 | −1.3 ± 3.4 |
| n-propanol | 108.4 ± 1.0 | 108.9 ± 1.0 | 0.5 ± 1.4 |
| n-butanol | 108.4 ± 1.0 | 104.2 ± 1.6 | −4.2 ± 1.9 |
| methyl ethyl keton | 108.4 ± 1.0 | 106.8 ± 1.4 | −1.6 ± 1.7 |
| tri ethyleneglycol | 108.4 ± 1.0 | 109.7 ± 0.5 | 1.3 ± 1.1 |
| ethyl acetate | 108.4 ± 1.0 | 109.2 ± 0.5 | 0.8 ± 1.1 |
| perfluorodecalin | 108.4 ± 1.0 | 108.7 ± 0.9 | 0.3 ± 1.3 |
| heptane | 108.4 ± 1.0 | 107.2 ± 2.7 | −1.2 ± 2.9 |
| decane | 108.4 ± 1.0 | 106.4 ± 1.1 | −2 ± 1.5 |

TABLE 3

COOH-terminated SAM on Au stored in different solvents for 22 and 54 days at 21-26° C.

| | storage time | | | | |
|---|---|---|---|---|---|
| | values of CA | | | change of CA values after | |
| medium | fresh | 22 days | 54 days | 22 days | 54 days |
| $H_2O$ | ≦10.0 | 12.3 ± 6.2 | 10.6 ± 3.5 | 2.3 ± 6.2 | 0.6 ± 3.5 |
| methanol | ≦10.0 | 48.8 ± 2.8 | 48.5 ± 3.0 | 38.8 ± 2.8 | 38.5 ± 3.0 |
| perfluoro-decalin | ≦10.0 | 61.3 ± 4.1 | 57.8 ± 3.2 | 51.3 ± 4.1 | 47.8 ± 3.2 |
| ethanol | ≦10.0 | 20.4 ± 3.2 | 23.6 ± 8.7 | 10.4 ± 3.2 | 13.6 ± 8.7 |
| isopropanol | ≦10.0 | 21.8 ± 3.9 | 23.0 ± 3.0 | 11.8 ± 3.9 | 13.0 ± 3.0 |
| decane | ≦10.0 | 47.5 ± 3.2 | 48.0 ± 2.3 | 37.5 ± 3.2 | 38.0 ± 2.3 |
| n-heptane | ≦10.0 | 81.4 ± 4.2 | 79.3 ± 3.1 | 71.4 ± 4.2 | 69.3 ± 3.1 |

TABLE 4

$CH_3$-terminated SAM on Au stored in different solvents for 22 and 54 days at 21-26° C.

| | storage time | | | | |
|---|---|---|---|---|---|
| | values of CA | | | change of CA values after | |
| medium | fresh | 22 days | 54 days | 22 days | 54 days |
| $H_2O$ | 104.3 ± 1.0 | 96.1 ± 4.7 | 90.3 ± 7.7 | −8.2 ± 4.8 | −14.0 ± 7.8 |
| methanol | 104.3 ± 1.0 | 100.3 ± 1.4 | 98.8 ± 2.4 | −4.0 ± 1.7 | −5.5 ± 2.6 |
| perfluorodecalin | 104.3 ± 1.0 | 101.8 ± 1.0 | 98.0 ± 2.7 | −2.5 ± 1.4 | −6.3 ± 2.8 |
| ethanol | 104.3 ± 1.0 | 100.9 ± 1.1 | 91.4 ± 8.2 | −3.4 ± 1.5 | −12.9 ± 8.3 |
| isopropanol | 104.3 ± 1.0 | 103.0 ± 1.5 | 104.1 ± 1.7 | −1.3 ± 1.8 | −0.2 ± 2.0 |
| decane | 104.3 ± 1.0 | 87.2 ± 6.1 | 70.1 ± 6.1 | −17.1 ± 6.2 | −34.2 ± 6.2 |
| n-heptane | 104.3 ± 1.0 | 81.4 ± 4.2 | 83.9 ± 2.3 | −22.9 ± 4.4 | −20.4 ± 2.5 |

TABLE 5

COOH-terminated SAM on Au stored in different solvents for 33 days at 20° C.

| | storage time | | |
|---|---|---|---|
| | values of CA | | change of CA values after |
| medium | ≦10.0 | 33 days | 33 days |
| H$_2$O + isopropanol 1:1 | ≦10.0 | ≦10.0 | not measurable |
| n-propanol | ≦10.0 | 72.9 ± 1.3 | 62.9 ± 1.3 |
| n-butanol | ≦10.0 | 54.2 ± 0.6 | 44.2 ± 0.6 |
| methyl ethyl keton | ≦10.0 | 55.7 ± 4.2 | 45.7 ± 4.2 |
| tri ethyleneglycol | ≦10.0 | 34.9 ± 1.7 | 24.9 ± 1.7 |
| ethyl acetate | ≦10.0 | 54.6 ± 3.3 | 44.6 ± 3.3 |

TABLE 6

CH$_3$-terminated SAM on Au stored in different solvents for 33 days at 20° C.

| | storage time | | |
|---|---|---|---|
| | values of CA | | change of CA values after |
| medium | fresh | 33 days | 33 days |
| H$_2$O + isopropanol 1:1 | 106.1 ± 0.3 | 107.0 ± 1.1 | 0.9 ± 1.2 |
| n-propanol | 106.1 ± 0.3 | 97.2 ± 3.2 | −8.9 ± 3.2 |
| n-butanol | 106.1 ± 0.3 | 91.8 ± 0.7 | −14.3 ± 0.8 |
| methyl ethyl keton | 106.1 ± 0.3 | 53.5 ± 3.0 | −52.6 ± 3.0 |
| tri ethyleneglycol | 106.1 ± 0.3 | 107.4 ± 0.6 | 1.3 ± 0.6 |
| ethyl acetate | 106.1 ± 0.3 | 56.9 ± 2.2 | −49.2 ± 2.3 |

TABLE 7

COOH-terminated SAM on Au stored in different solvents for 53 days at 20° C.

| | storage time | | |
|---|---|---|---|
| | values of CA | | change of CA values after |
| medium | fresh | 53 days | 53 days |
| H$_2$O + isopropanol 1:9 | ≦10.0 | 19.6 ± 1.8 | 9.6 ± 1.8 |
| H$_2$O + isopropanol 1:1 | ≦10.0 | 10.0 ± 2.9 | 0.0 ± 2.9 |
| H$_2$O + isopropanol 9:1 | ≦10.0 | 10.1 ± 1.6 | 0.1 ± 1.6 |
| Ethanol + iso-propanol 1:1 | ≦10.0 | 10.2 ± 1.0 | 0.2 ± 1.0 |
| H$_2$O + Ethanol 1:1 | ≦10.0 | ≦10.0 | not measurable |

TABLE 8

CH$_3$-terminated SAM on Au stored in different solvents for 53 days at 20° C.

| | storage time | | |
|---|---|---|---|
| | values of CA | | change of CA values after |
| medium | fresh | 53 days | 53 days |
| H$_2$O + isopropanol 1:9 | 108.8 ± 1.2 | 108.8 ± 1.8 | 0.0 ± 2.2 |
| H$_2$O + isopropanol 1:1 | 108.8 ± 1.2 | 109.0 ± 0.4 | 0.2 ± 1.3 |
| H$_2$O + isopropanol 9:1 | 108.8 ± 1.2 | 105.1 ± 0.5 | −3.7 ± 1.3 |
| ethanol + iso-propanol 1:1 | 108.8 ± 1.2 | 109.0 ± 0.7 | 0.2 ± 1.4 |
| H$_2$O + Ethanol 1:1 | 108.8 ± 1.2 | 107.9 ± 0.8 | −0.9 ± 1.4 |

To determine the susceptibility of a sensor surface to be degraded due to adhering gas bubbles, the following experiment was performed.

Sensors, such as Atomic Force Sensors generally have very small dimensions. A typical AFM sensor (for example 1 mm×3 mm) has a pyramidal tip mounted on a 20 μm×100 μm cantilever. The pyramidal tip has a typical sensing area of <400 nm$^2$. Because it is difficult to observe the presence of bubbles on the sensing area, a model system was adopted. This model system is made of hydrophobic plastic, and because bubbles are more easily retained on hydrophobic surfaces than on hydrophilic surfaces, this is believed to be a proper model system. 1.8 ml polypropylene containers (Cryotube™ vials, Nunc AS, Roskilde, Denmark) with polyethylene screw cap were filled ⅔ with liquid mixture and closed. After repeated manually shaking the container and holding it horizontally for 2 seconds, the container is placed vertically on a table. The number of gas bubbles trapped on the container wall are counted immediately after placing the container on the table and again after 1 hour (no significant changes were observed in this period). This procedure was done in triplicate and repeated once, i.e. the data is the mean value of 6 independent measurements.

TABLE 9

Bubble test

| liquid mixture | number of bubbles on container wall (after 1 hr) | >5 bubbles = fail <5 bubbles = pass |
|---|---|---|
| water | >10 | fail |
| water-isopropanol 1:9 | 0 | pass* |
| water-isopropanol 1:3 | 0 | pass* |
| water-isopropanol 1:1 | 0 | pass* |
| water-isopropanol 3:1 | 4 | pass** |
| water-isopropanol 9:1 | >10 | fail |
| ethanol-isopropanol 1:1 | 0 | pass |
| water-ethanol 1:1 | 4 | pass** |

*Not a single bubble was observed.
**For these mixtures some foam was formed in some (not all) experiments; this caused a significant number of bubbles and therefore a spread in the mean data (no bubble to >10 bubbles in one case).

The invention claimed is:

1. A method of preserving a sensor in a container, said sensor comprising a sensing area of metallic or a semi-conducting material covered with molecules having a MW>100 Dalton, said molecules being bound to the material, comprising:
keeping at least the sensing area submerged in a storage solution, said storage solution having a composition that comprises at least 80% by volume of one or more of the compounds in the group consisting of water, ethanol, triethylene glycol and isopropanol, with the provisos that:
a) if ethanol is present, the ethanol is present in a concentration of no more than 93% by volume of the storage solution; and
b) if water is present, the water is present in a concentration of less than 80% by volume of the storage solution.

2. The method according to claim 1, wherein the storage solution comprises at least 90% by volume of at least two compounds chosen from water, ethanol, triethylene glycol and isopropanol.

3. The method according to claim 2, wherein each of at least two compounds chosen from water, ethanol, triethylene glycol and isopropanol are present in a concentration of at least 8% by volume each with respect to the storage solution.

4. The method according to claim 3, wherein the storage solution consists of at least 90% by volume of water and isopropanol.

5. The method according to claim 4, wherein the storage solution is treated with an inert gas.

6. The method according to claim 5, wherein the inert gas is argon.

7. The method according to claim 3, wherein the storage solution is treated with an inert gas.

8. The method according to claim 2, wherein the storage solution consists of at least 90% by volume of water and isopropanol.

9. The method according to claim 8, wherein the storage solution is treated with an inert gas.

10. The method according to claim 2, wherein the storage solution is treated with an inert gas.

11. The method according to claim 1, wherein the storage solution is treated with an inert gas.

12. The method according to claim 1, wherein the storage solution comprises at least 98% by volume of at least two compounds chosen from water, ethanol, triethylene glycol and isopropanol.

13. The method according to claim 12, wherein each of at least two compounds chosen from water, ethanol, triethylene glycol and isopropanol are present in a concentration of at least 30% by volume each with respect to the storage solution.

14. The method according to claim 13, wherein the storage solution is treated with argon.

15. The method according to claim 14, wherein the sensor is an atomic force microscopy sensor having a self-assembled monolayer.

16. The method according to claim 12, wherein the storage solution contains at least 25% by volume isopropanol and at least 10% by volume of either water or ethanol.

17. The method according to claim 1, wherein the sensor is an atomic force microscopy sensor having a self-assembled monolayer.

18. The method according to claim 17, wherein the sensor has a sensing area of less than 400 $nm^2$.

19. The method according to claim 18, wherein the storage solution is treated with argon.

20. Container containing a sensor and a storage solution, said sensor comprising a sensing area of metallic or a semi-conducting material covered with molecules having a MW>100 Dalton, said molecules being bound to the material, at least the sensing area being submerged in a storage solution, said storage solution having a composition that comprises at least 80% by volume of one or more of the compounds in the group consisting of water, ethanol, triethylene glycol and isopropanol, with the provisos that:
a) if ethanol is present, the ethanol is present in a concentration of no more than 93% by volume of the storage solution; and
b) if water is present, the water is present in a concentration of less than 80% by volume of the storage solution.

* * * * *